(12) United States Patent
Ohiwa et al.

(10) Patent No.: US 10,655,305 B2
(45) Date of Patent: May 19, 2020

(54) WORK VEHICLE AND METHOD FOR CONTROLLING WORK VEHICLE

(71) Applicant: KOMATSU LTD., Tokyo (JP)

(72) Inventors: Kenji Ohiwa, Tokyo (JP); Masao Yamamura, Tokyo (JP); Tomohiro Nakagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/064,635

(22) PCT Filed: Nov. 29, 2016

(86) PCT No.: PCT/JP2016/085347
§ 371 (c)(1),
(2) Date: Jun. 21, 2018

(87) PCT Pub. No.: WO2017/110382
PCT Pub. Date: Jun. 29, 2017

(65) Prior Publication Data
US 2018/0371724 A1    Dec. 27, 2018

(30) Foreign Application Priority Data

Dec. 25, 2015    (JP) .................................. 2015-253704

(51) Int. Cl.
*E02F 9/26* (2006.01)
*E02F 9/20* (2006.01)
(Continued)

(52) U.S. Cl.
CPC ............ *E02F 9/262* (2013.01); *E02F 9/2058* (2013.01); *E02F 9/261* (2013.01);
(Continued)

(58) Field of Classification Search
CPC .... E02F 9/262; E02F 9/2058; B60K 2370/55; G02B 27/0101; G06T 17/05
(Continued)

(56) References Cited

U.S. PATENT DOCUMENTS

| 5,721,679 A | 2/1998 | Monson |
| 2003/0004645 A1* | 1/2003 | Kochi .................... G01C 15/00 702/1 |

(Continued)

FOREIGN PATENT DOCUMENTS

| CN | 104884713 A | 9/2015 |
| JP | 2001-148092 A | 5/2001 |

(Continued)

*Primary Examiner* — Yazan A Soofi
(74) *Attorney, Agent, or Firm* — Faegre Drinker Biddle & Reath LLP

(57) ABSTRACT

A work vehicle includes a work implement, a main body, a display device, and a display controller. To the main body, the work implement is attached, and the main body has a cab. The display device is provided in the cab and configured to overlay and thus display work assistance information on an actual view of a work site. The display controller causes the display device to display target design topography as work assistance information. When a work starts, the display controller causes the display device to display final target design topography that is achieved after the work is completed, and subsequently, switches to displaying target design topography to be achieved depending on a working step performed.

5 Claims, 8 Drawing Sheets

(51) Int. Cl.
*G02B 27/01* (2006.01)
*G06T 17/05* (2011.01)
*E02F 3/43* (2006.01)

(52) U.S. Cl.
CPC ........... *B60K 2370/55* (2019.05); *E02F 3/435* (2013.01); *G02B 27/0101* (2013.01); *G06T 17/05* (2013.01)

(58) Field of Classification Search
USPC .......................................................... 701/50
See application file for complete search history.

(56) References Cited

U.S. PATENT DOCUMENTS

| | | | |
|---|---|---|---|
| 2005/0027420 A1* | 2/2005 | Fujishima | E02F 9/2045 701/50 |
| 2007/0146166 A1* | 6/2007 | Sato | B62D 15/028 340/932.2 |
| 2013/0158797 A1 | 6/2013 | Fukano et al. | |
| 2016/0069040 A1* | 3/2016 | Kami | E02F 3/437 701/50 |
| 2016/0193920 A1* | 7/2016 | Tsubone | E02F 9/261 701/36 |
| 2016/0251836 A1* | 9/2016 | Baba | E02F 3/435 701/50 |
| 2016/0312434 A1* | 10/2016 | Shintani | E02F 9/262 |

FOREIGN PATENT DOCUMENTS

| | | |
|---|---|---|
| JP | 2002-352224 A | 12/2002 |
| JP | 2004-107925 A | 4/2004 |
| JP | 2007-176324 A | 7/2007 |
| JP | 2009-243073 A | 10/2009 |
| JP | 2014-129676 A | 7/2014 |
| KR | 10-2013-0044338 A | 5/2013 |

* cited by examiner

WORK VEHICLE AND METHOD FOR CONTROLLING WORK VEHICLE

TECHNICAL FIELD

The present invention relates to a work vehicle and a method for controlling the work vehicle, and more specifically to displaying an image in the work vehicle.

BACKGROUND ART

Conventionally, a work vehicle such as a hydraulic excavator has been known. Such a work vehicle has a main body and a work implement connected to the main body. For example, a work implement of a hydraulic excavator has a boom, a dipper stick, and a bucket in the stated order as seen on the side of the main body.

Japanese Patent Laying-Open No. 2009-243073 (Patent Document 1) discloses a hydraulic excavator as an example of a work vehicle. The hydraulic excavator includes a cab, a work implement, a display device, and a display position controller. The work implement is operated as manipulated by an operator in the cab. The display device is provided in the cab and displays a predetermined image.

CITATION LIST

Patent Document

PTD 1: Japanese Patent Laying-Open No. 2009-243073

SUMMARY OF INVENTION

Technical Problem

A display device provided on a front surface of a cab is a transmission-type display device and is provided so that the operator in the cab can see the work implement.

Accordingly, in order to appropriately obtain necessary information from a predetermined image displayed on the display device while efficiently manipulating the visually observed work implement, it is necessary to present appropriate information in accordance with a working step.

The present invention has been made in view of the above, and an object of the present invention is to provide a work vehicle which can achieve further increased working efficiency, and a method for controlling the work vehicle.

Solution to Problem

A work vehicle according to one aspect comprises a work implement, a main body, a display device, and a display controller. To the main body, the work implement is attached, and the main body has a cab. The display device is provided in the cab and configured to overlay and thus display work assistance information on an actual view of a work site. The display controller causes the display device to display target design topography as work assistance information. When a work starts, the display controller causes the display device to display final target design topography that is achieved after the work is completed, and subsequently, switches to displaying target design topography to be achieved depending on a working step performed.

When an operator starts a work, the operator can confirm final target design topography that is achieved after the work is completed, and can subsequently confirm target design topography to be achieved depending on the working step, and the operator can thus accurately understand the work's contents and achieve further increased working efficiency.

Preferably, the work vehicle further comprises a storage storing the final target design topography divided into a plurality of segments. The display controller switches target design topography displayed on the display device corresponding to a first segment to displaying target design topography corresponding to a second segment.

The working operator can confirm target design topography divided for each segment and accordingly obtain a large working field of view, and the operator can thus accurately understand the work's contents and achieve further increased working efficiency.

Preferably, in response to an indication of a manipulation done by an operator in the cab, the display controller switches the target design topography displayed on the display device corresponding to the first segment to displaying the target design topography corresponding to the second segment.

Target design topography divided for each segment can be confirmed in response to an indication of a manipulation and target design topography can thus be easily switched depending on the working step, and further increased working efficiency can thus be achieved.

Preferably, the work vehicle further comprises an information obtainer configured to obtain information of the current topography. Based on a comparison of the information of the current topography obtained by the information obtainer with the target design topography, the display controller switches the target design topography displayed on the display device corresponding to the first segment to displaying the target design topography corresponding to the second segment.

Based on a comparison of the information of the current topography obtained by the information obtainer with the target design topography, the target design topography corresponding to the first segment can be switched to displaying the target design topography corresponding to the second segment, and no user operation is required therefor and further increased working efficiency can be achieved.

According to one aspect, a method for controlling a work vehicle comprising: a work implement; a main body to which the work implement is attached, and having a cab; and a display device provided in the cab and configured to overlay and thus display work assistance information on an actual view of a work site, comprises the steps of: when a work starts, displaying on the display device as work assistance information final target design topography that is achieved after the work is completed; and after the final target design topography is displayed, switching to displaying target design topography to be achieved depending on a working step performed.

When an operator starts a work, the operator can confirm final target design topography that is achieved after the work is completed, and can subsequently confirm target design topography to be achieved depending on the working step, and the operator can thus accurately understand the work's contents and achieve further increased working efficiency.

Advantageous Effects of Invention

The present work vehicle and method for controlling the same can achieve further increased working efficiency.

DESCRIPTION OF EMBODIMENTS

The present invention will now be described in an embodiment hereinafter with reference to the drawings. In the following description, identical components are identically denoted. Their names and functions are also identical. Accordingly, they will not be described repeatedly. In the following description, "upper," "lower," "front," "rear," "right," and "left" are terms with reference to an operator seated on an operator's seat.

A. General Configuration

Figure 1:
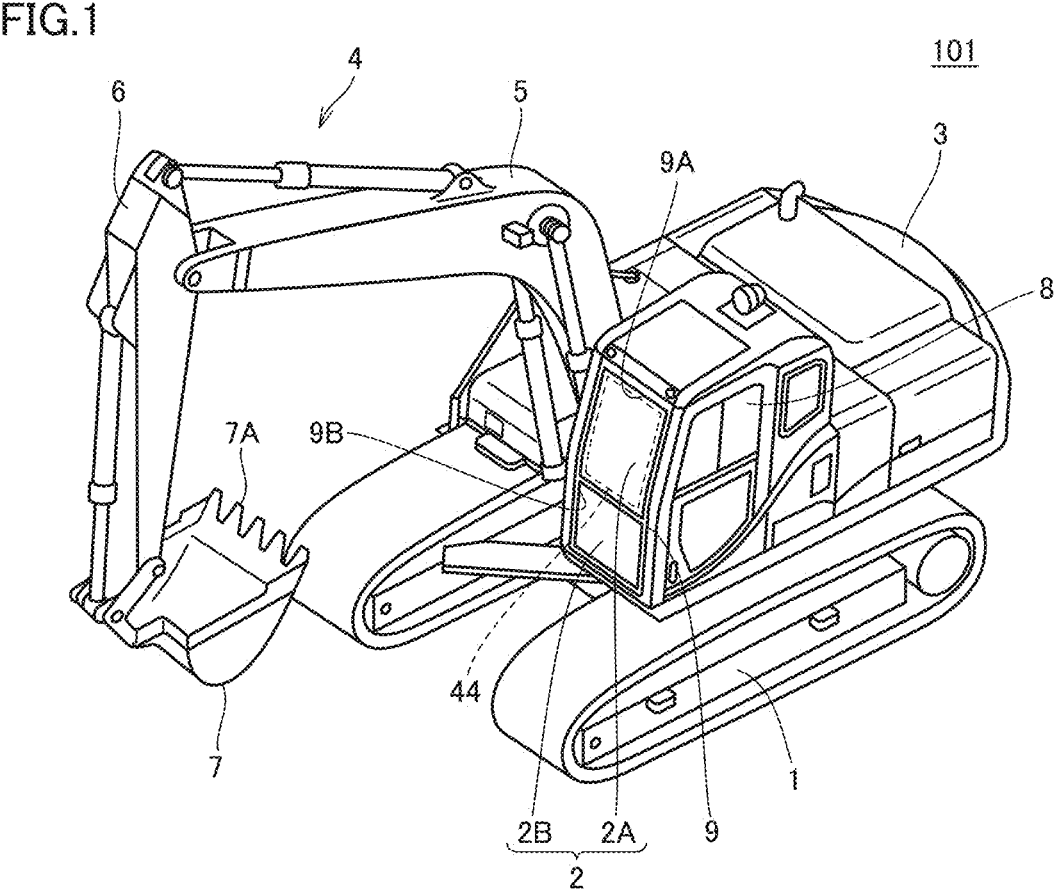
FIG. 1 is a diagram for illustrating an appearance of a work vehicle 101 according to an embodiment.

FIG. 1 is a diagram for illustrating an appearance of a work vehicle 101 according to an embodiment.

As shown in FIG. 1, a hydraulic excavator will be described as an example of work vehicle 101 according to the embodiment.

Work vehicle 101 mainly includes a travel unit 1, a revolving unit 3, and a work implement 4.

Work vehicle 101 has a main body composed of travel unit 1 and revolving unit 3. The main body has work implement 4 attached thereto. Travel unit 1 has a pair of right and left crawler belts. Revolving unit 3 is mounted via a revolving mechanism of travel unit 1 revolvably. Revolving unit 3 has a cab 8 and the like.

Work implement 4 is pivotally supported at revolving unit 3 so as to be movable upward and downward and performs a work such as excavation of soil. Work implement 4 includes a boom 5, a dipper stick 6, and a bucket 7. Work implement 4 is provided at a position visually observable on a right and front side as seen from cab 8.

Boom 5 has a base movably coupled to revolving unit 3. Dipper stick 6 is movably coupled to the distal end of boom 5. Bucket 7 is movably coupled to the distal end of dipper stick 6. Bucket 7 is movable upward and downward relative to cab 8. Further, bucket 7 is also movable frontward and rearward relative to cab 8. Bucket 7 has teeth 7A.

Cab 8 has a front windshield 2. Front windshield 2 is fixed by a frame 9. Front windshield 2 is composed of a front windshield 2A and a front windshield 2B located below front windshield 2A. Front windshield 2A is provided inside an opening frame 9A (inside an opening frame), and front windshield 2B is provided inside a lower opening frame 9B. Front windshields 2A and 2B are separately provided to match how frame 9 in front of cab 8 is bent. Front windshields 2A and 2B thus separated ensure that the operator can have a wide field of view and the frame and the like can also be strong.

Display device 44 is attached in front of an operator's seat in cab 8 of work vehicle 101. In the present embodiment, display device 44 is composed of a member (a film or the like) which transmits external light incident on cab 8, and a projection device (projector). The projection device projects an image which is in turn displayed as a real image on the member (such as a film) that transmits external light. Display device 44 has a display area provided inside opening frame 9A provided on a front surface of cab 8 of work vehicle 101. The operator in cab 8 can visually observe an actual view of a work site including work implement 4 through the display area of display device 44. Display device 44 overlays on the actual view of the work site and thus display information for assisting the operator to manipulate work implement 4 (hereinafter also referred to as a work) (hereinafter also referred to as work assistance information). Display device 44 functions as a head-up display that directly displays an image in the field of view of the operator.

The member that transmits external light, such as a film, of display device 44 is placed on front windshield 2A. Display device 44 has a display extending to reach an edge of front windshield 2A. Front windshield 2A may be the same as or different from the display area of display device 44 in size.

While in the present embodiment, as display device 44, a configuration will be described in which an image projected by a projection device (projector) is displayed on a member (such as a film) that transmits external light incident on cab 8, this is not exclusive, and it is also possible to have a configuration including display device 44 which is a transparent display (for example, a transmission type liquid crystal display).

B. Configuration of Control System

Figure 2:
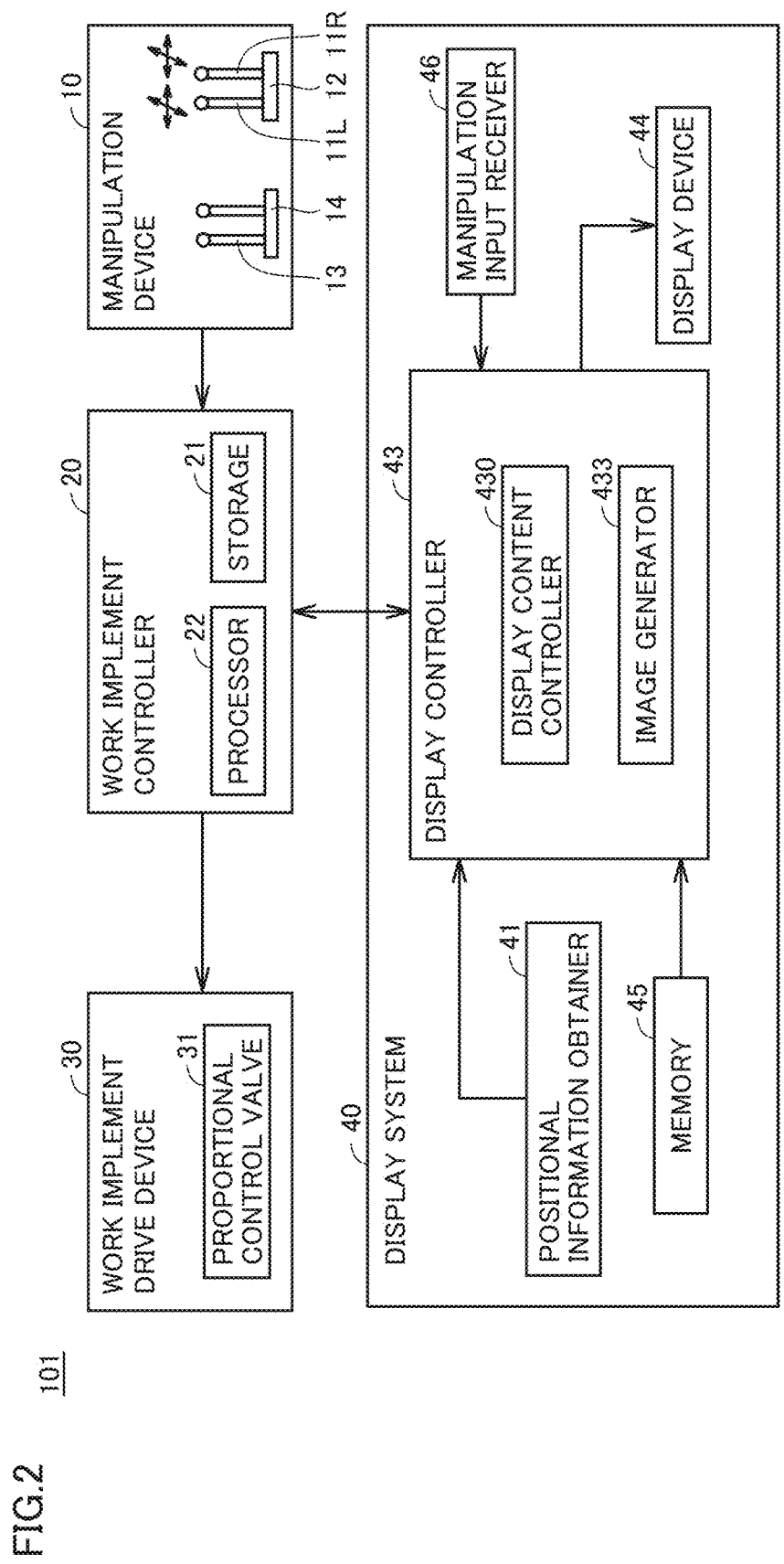
FIG. 2 is a block diagram representing a configuration of a control system included in work vehicle 101 according to an embodiment.

FIG. 2 is a block diagram representing a configuration of a control system included in work vehicle 101 according to an embodiment.

As shown in FIG. 2, work vehicle 101 includes a manipulation device 10, a work implement controller 20, a work implement drive device 30, and a display system 40.

(b1. Manipulation Device 10)

Manipulation device 10 includes manipulation members 11L and 11R, a manipulation detector 12, a travel manipulation member 13, and a travel manipulation detector 14. In addition to these, manipulation device 10 has a manipulation button capable of receiving various manipulations, although not shown. For example, it includes a manipulation button for operating the engine, and a manipulation button for inputting a predetermined command to display system 40. In the present embodiment, the predetermined command is a command to change content of target design topography displayed on display device 44.

Manipulation members 11L and 11R are used by the operator to manipulate work implement 4 and revolving unit 3. Manipulation member 11R is used by the operator to manipulate boom 5 and bucket 7. Manipulation member 11L is used by the operator to manipulate revolving unit 3 and dipper stick 6.

Manipulation detector 12 detects a manipulation done by the operator to manipulation member 11L. Manipulation detector 12R detects a manipulation done by the operator to manipulation member 11R.

Travel manipulation member 13 is used by the operator to control traveling of work vehicle 101. Travel manipulation detector 14 detects a pilot flow rate according to content of control done via travel manipulation member 13. Work vehicle 101 moves at a speed corresponding to the pilot flow rate.

(b2. Work Implement Controller 20)

Work implement controller 20 includes a storage 21 and a processor 22. Storage 21 is composed of memory such as RAM (Random Access Memory) and ROM (Read Only Memory). Processor 22 is composed of a processing device such as a CPU (Central Processing Unit).

Work implement controller 20 mainly controls the operation of work implement 4 and the revolution of revolving unit 3. Work implement controller 20 generates a control signal for operating work implement 4 and revolving unit 3 in response to a manipulation done to manipulation members 11L and 11R. Work implement controller 20 outputs the generated control signal to work implement drive device 30.

(b3. Work Implement Drive Device 30)

Work implement drive device 30 has a proportional control valve 31. Proportional control valve 31 operates based on a control signal issued from work implement controller 20. Proportional control valve 31 supplies a hydraulic cylinder and a revolution motor with hydraulic oil at a flow rate corresponding to the control signal. As a result, work implement 4 operates and revolving unit 3 revolves.

(b4. Display System 40)

Display device 44 of display system 40 displays various types of images such as work assistance information.

Display system 40 includes a positional information obtainer 41, a display controller 43, a display device 44, a memory 45, and a manipulation input receiver 46.

Positional information obtainer 41 obtains positional information used for working using work implement 4 of work vehicle 101. For example, it is possible to obtain the positional information by using a GPS (Global Positioning System) or the like.

Memory 45 stores data for displaying target design topography associated with the positional information.

Display controller 43 includes a display content controller 430 and an image generator 433.

Display controller 43 causes display device 44 to display work assistance information.

Image generator 433 generates an image of target design topography for the current topography as work assistance information based on data stored in memory 45. Image generator 433 may generate an image representing work assistance information other than the target design topography.

Display content controller 430 causes display device 44 to display the image of the target design topography generated by image generator 433 for the current topography. Further, display content controller 430 changes content of the work assistance information depending on the working step, and causes display device 44 to display the changed content.

Manipulation input receiver 46 receives an input of a manipulation via manipulation device 10. For example, manipulation input receiver 46 receives an input via an operation button provided to manipulation device 10 for inputting a predetermined command to display system 40. As an example, manipulation input receiver 46 receives an input of a command in accordance with an input via the operation button to change content of target design topography displayed on display device 44.

Each function block of display system 40 is implemented by using a processor such as a CPU, a program stored in a storage device such as RAM and ROM, and the like.

C. Method for Displaying Work Assistance Information

Figure 3:
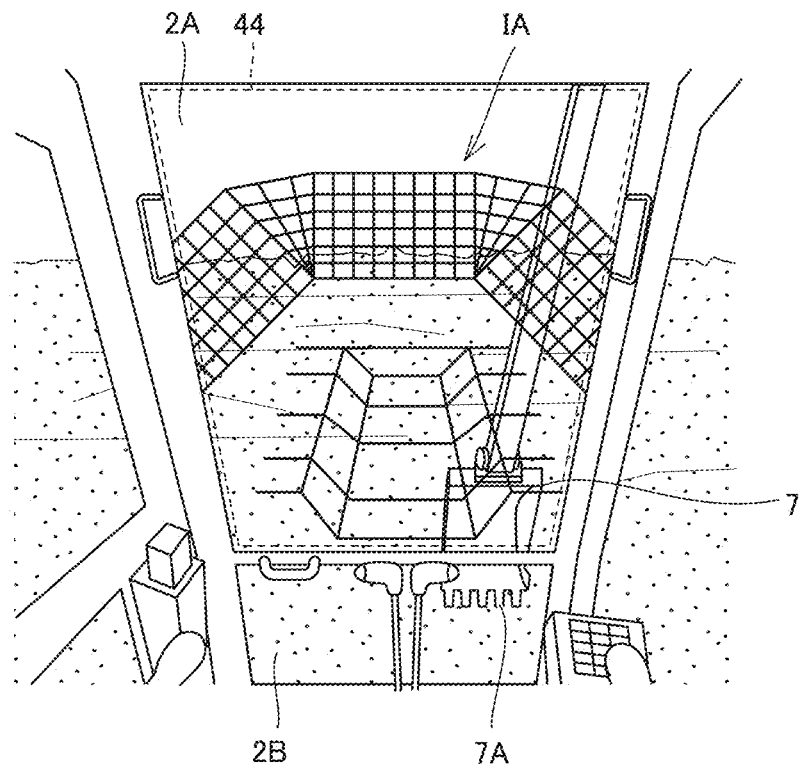
FIG. 3 is a diagram showing contents of work assistance information displayed by a display device 44 according to an embodiment.

FIG. 3 is a diagram showing contents of work assistance information displayed by display device 44 according to an embodiment.

As shown in FIG. 3, herein, an example of work assistance information displayed when a work starts is shown. Specifically, an entire image IA of final target design topography that is achieved after the work is completed is displayed relative to the current topography.

Displaying entire image IA of the final target design topography that is achieved after the work is completed allows the operator to know the final target design topography relative to the current topography and hence the work's content to achieve further increased working efficiency.

Figure 4:
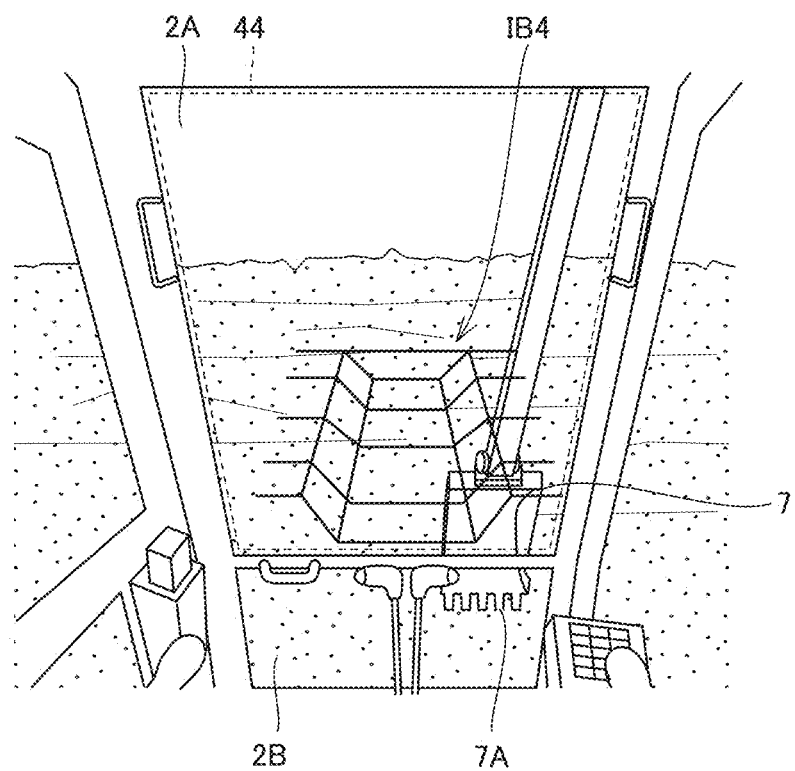
FIG. 4 is a diagram showing different contents of work assistance information displayed by display device 44 according to an embodiment.

FIG. 4 is a diagram showing another content of work assistance information displayed by display device 44 according to an embodiment.

As shown in FIG. 4, herein, an example of work assistance information to be achieved depending on a working step performed is shown.

Construction for final target design topography may be done through a plurality of working steps. In that case, target design topography to be achieved varies for each working step. Accordingly, display controller 43 displays target design topography to be achieved depending on the current working step, as shown in FIG. 4. Note that the current working step may be known from the current topography, as will be described in detail later, or may be known through an instruction input by the operator to switch it.

Further, target design topography to be achieved for each working step may be a part of final target design topography or may be intermediate design topography as seen from the final target design topography. FIG. 4 displays an image IB4 showing a part of final target design topography.

Thus displaying image IB4 indicating target design topography for each working step allows the operator to know target design topography to be achieved in the current working step. When thus displaying an image indicating target design topography for each working step is compared with keeping displaying final target design topography, the former ensures a wide working field of view and also allows the operator to clearly know target design topography for each working step, and can thus achieve further increased working efficiency.

Note that the operator may operate a button to proceed to a further working step or revert to a previous working step to allow target design topography to be switched as desired for each working step. Further, the operator may operate a button to select and display partial target design topography of final target design topography.

Figure 5:
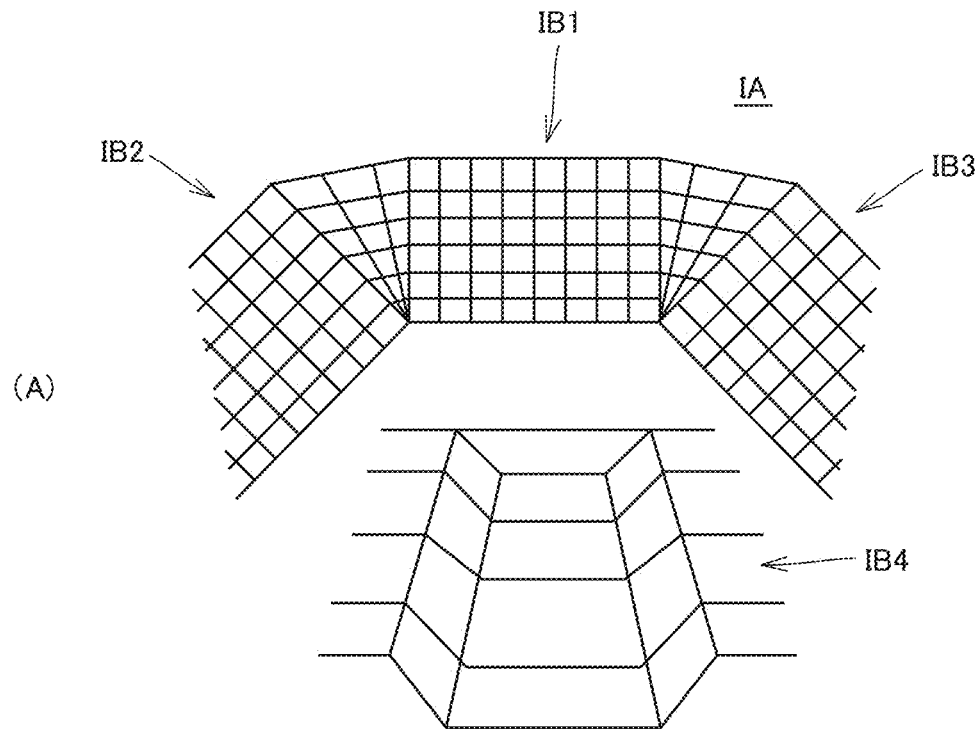
FIG. 5 is a diagram for illustrating target design topography according to an embodiment.

FIG. 5 is a diagram for illustrating target design topography according to the embodiment.

As shown in FIG. 5(A), entire image IA of final target design topography is divided into a plurality of regional images for each working step.

More specifically, a case is shown in which it is divided into four regions. It is divided into images IB1 to IB4 corresponding to partial target design topography of the final target design topography.

FIG. 5(B) is a diagram for illustrating target design topography data stored in memory 45.

As shown in FIG. 5(B), the target design topography data is stored in association with positional information.

Based on positional information obtained by positional information obtainer 41, target design topography data associated with the positional information is read from memory 45 and displayed on display device 44.

In this example is shown target design topography data corresponding to images IB1 to IB4 corresponding to partial target design topography obtained by dividing entire image IA of the final target design topography into four segments for each construction step. When there is an input of an operation command via an operation button, then, from target design topography data corresponding to one segment, target design topography data corresponding to another segment is read and an image based on the read target design topography data is displayed on display device 44.

Further, target design topography data is read in a predetermined order for the sake of illustration. In this example, target design topography is changed in the order of images IB1 to IB4.

D. Control Flow

Figure 6:
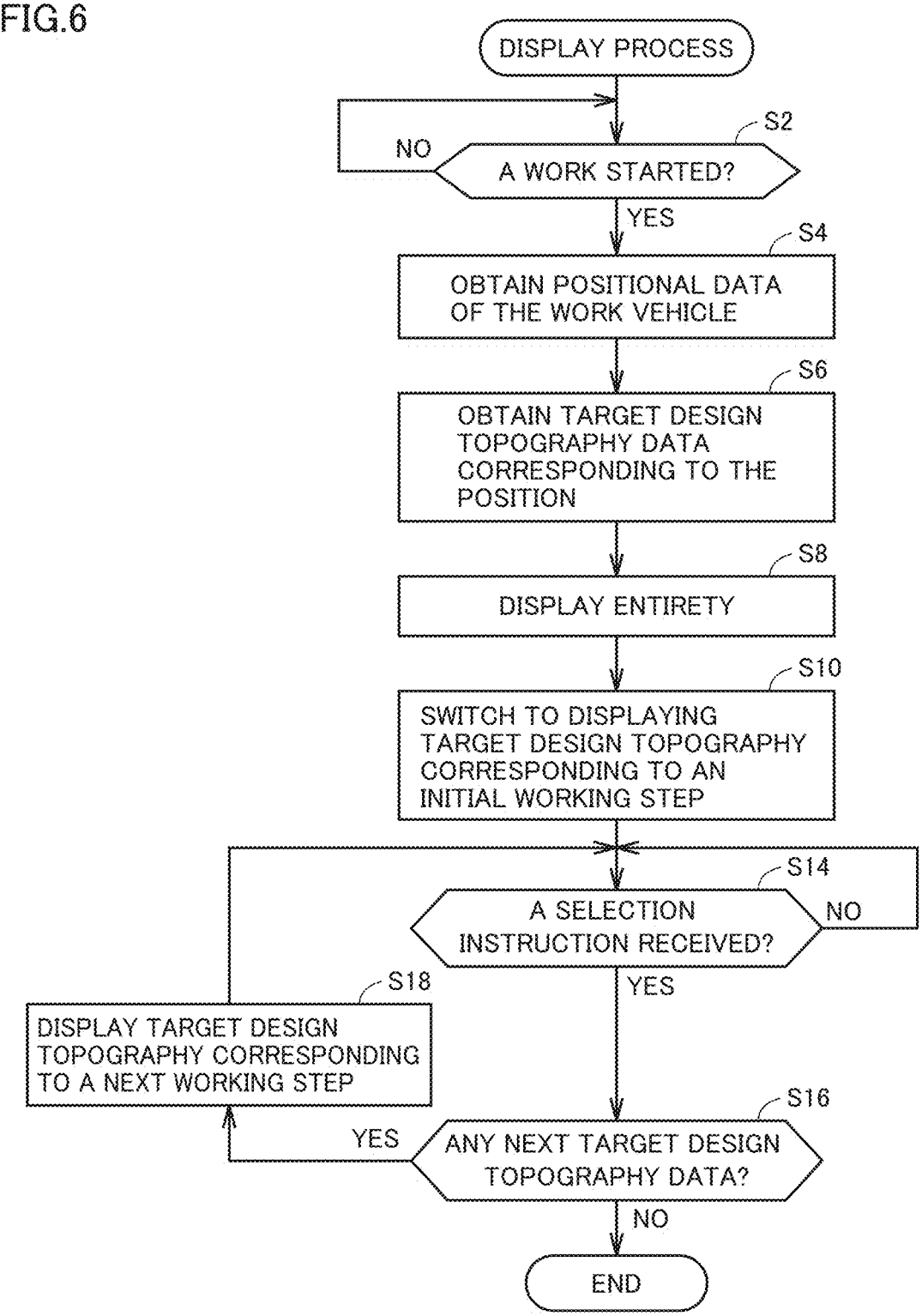
FIG. 6 is a flowchart for illustrating a process of displaying work assistance information according to an embodiment.

FIG. 6 is a flowchart for illustrating a process of displaying work assistance information according to an embodiment.

As shown in FIG. 6, display controller 43 determines whether a work has started (step S2). Specifically, as an example, display content controller 430 may determine that a work has started when an ignition plug of the engine is ignited or when an input of a manipulation via manipulation device 10 has been received. Further, display content controller 430 may determine so when a work has been started in response to a predetermined button operation.

Subsequently, display controller 43 waits until the work is started (NO in step S2), and when it is determined that the work has been started (YES in step S2), display controller 43 obtains positional data of the work vehicle (step S4). Specifically, positional information obtainer 41 obtains positional information of work vehicle 101.

Subsequently, display controller 43 obtains target design topography data corresponding to the position (step S6). Specifically, image generator 433 obtains target design topography data stored in memory 45, based on the positional information of work vehicle 101 obtained by positional information obtainer 41.

Subsequently, display controller 43 displays an entire image, which is final target design topography, based on the target design topography data. Specifically, image generator 433 generates an image of the final target design topography for the current topography as work assistance information based on the data stored in memory 45. Display content controller 430 displays the image of the final target design topography generated by image generator 433. As an example, display content controller 430 displays on display device 44 entire image IA of the final target design topography described with reference to FIG. 3.

Subsequently, after displaying the final target design topography that is achieved after a work is completed, display controller 43 switches it to displaying target design topography corresponding to an initial working step (step S10). Specifically, image generator 433 generates an image of the target design topography that corresponds to the initial working step for the current topography as work assistance information based on the data stored in memory 45. Display content controller 430 displays the image of the target design topography generated by image generator 433. As an example, display content controller 430 displays on display device 44 image IB of target design topography described with reference to FIG. 4.

Subsequently, display controller 43 determines whether a selection instruction is received (step S14). Specifically, manipulation input receiver 46 determines whether an input of a manipulation from manipulation device 10 (a selection instruction) has been received.

In step S14, display controller 43 waits until a selection instruction is received (NO in step S14), and when it is determined that the selection instruction has been received (YES in step S14), display controller 43 determines whether there is next target design topography data (step S16). When manipulation input receiver 46 has received an input of a manipulation, display content controller 430 determines whether next target design topography data is stored in memory 45.

For example, taking as an example the case described with reference to FIG. 5(B), when images IB1 to IB3 are displayed as target design topography data, it is determined that there is next target design topography data. On the other hand, when image IB4 is displayed it is determined that there is no next target design topography data.

In step S16, if it is determined that there is next target design topography data (YES in step S16), display controller 43 displays target design topography corresponding to a next working step (Step S18). When manipulation input receiver 46 has received an input of a manipulation, and it is determined that next target design topography data is stored in memory 45, display content controller 430 displays an image based on the next target design topography data corresponding thereto.

Subsequently, the control returns to step S14. A process subsequent thereto is similar, and accordingly, will not be described repeatedly.

In step S16, when it is determined that there is no next target design topography data (NO in step S16), the display controller ends the process (END). When manipulation input receiver 46 has received an input of a manipulation, and it is determined that there is no next target design topography data stored in memory 45, display content controller 430 ends the process.

E. Modification e1. First Modification

Figure 7:
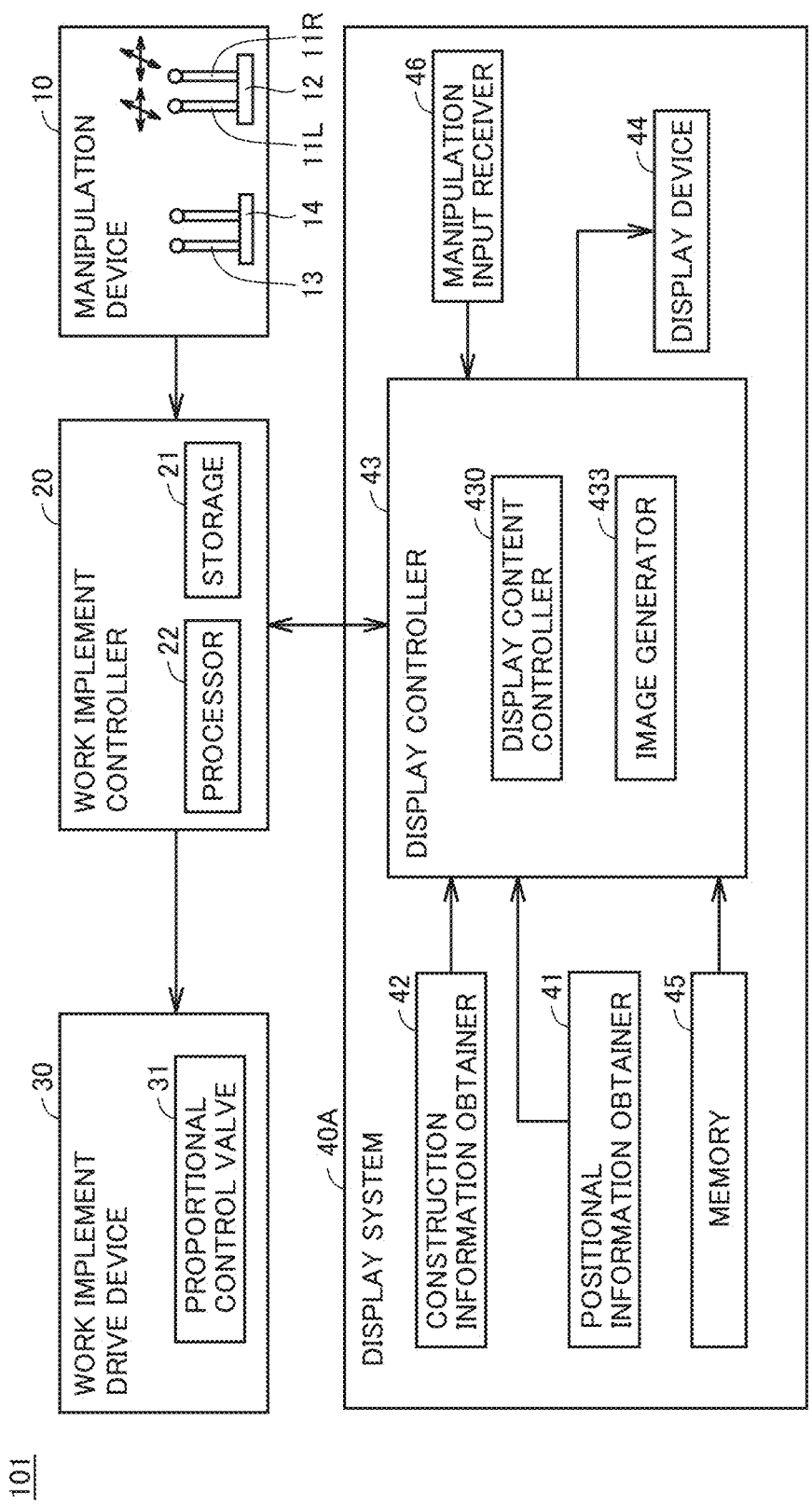
FIG. 7 is a block diagram representing a configuration of a control system included in work vehicle 101 according to a first modification of an embodiment.

FIG. 7 is a block diagram representing a configuration of a control system included in work vehicle 101 according to a first modification of an embodiment.

The FIG. 7 configuration differs from the FIG. 2 configuration in that display system 40 is replaced with a display system 40A.

Display system 40A is different from display system 40 in that a construction information obtainer 42 is added. The remainder in configuration is similar to that described with reference to FIG. 2, and accordingly, it will not be described repeatedly in detail.

Construction information obtainer 42 obtains construction information of the current topography. Specifically, construction information obtainer 42 obtains an image of the current topography captured by a camera or the like as construction information.

Display controller 43 receives the construction information obtained by construction information obtainer 42 and accordingly determines a construction status. Specifically, display content controller 430 determines a construction status based on construction information and target design topography data. Display content controller 430 determines based on the construction information whether the current topography is substantially the same as topography of target design topography data.

When display content controller 430 determines based on the construction information that the current topography is substantially the same as the topography of the target design topography data, display content controller 430 determines that the current working step is completed, and display content controller 430 displays on display device 44 target design topography based on target design topography data corresponding to a next working step.

Figure 8:
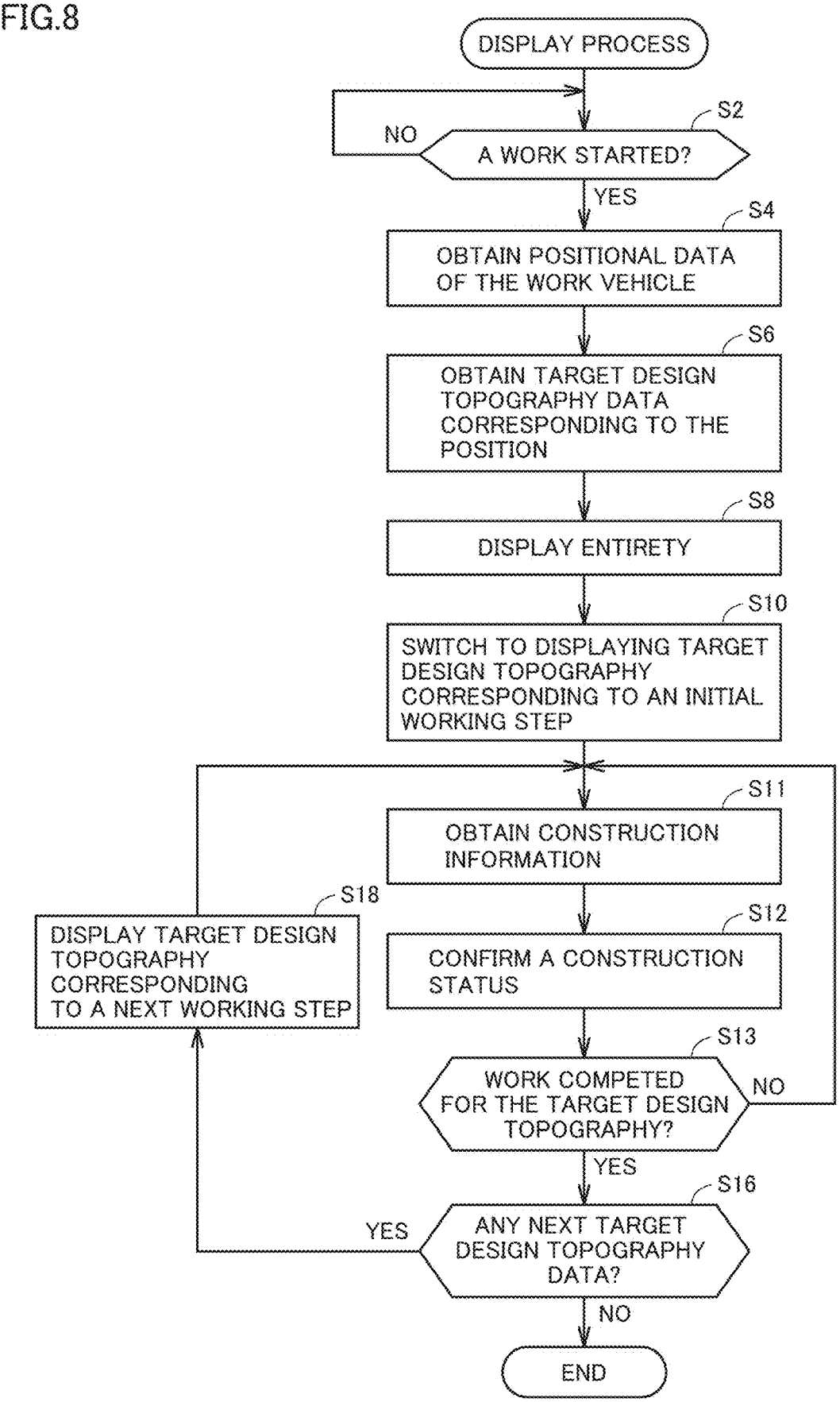
FIG. 8 is a flowchart for illustrating a process of displaying work assistance information according to the first modification of the embodiment.

FIG. 8 is a flowchart for illustrating a process of displaying work assistance information according to the first modification of the embodiment.

The FIG. 8 flowchart is different from the FIG. 6 flowchart in that step S14 is replaced with steps S11 to step S13. The remainder in the flowchart is similar, and accordingly, it will not be described repeatedly in detail.

In step S10, display controller 43 switches to displaying target design topography corresponding to an initial working step. Specifically, image generator 433 generates target design topography for the current topography corresponding to the initial working step as work assistance information based on data stored in memory 45. Display content controller 430 displays the target design topography generated by image generator 433. As an example, display content controller 430 displays on display device 44 image IB of target design topography described with reference to FIG. 4.

Subsequently, display controller 43 obtains construction information (step S11) Specifically, display content controller 430 obtains an image of the current topography captured by construction information obtainer 42 with a camera or the like as construction information.

Subsequently, display controller 43 confirms a construction status (step S12). Subsequently, based on the obtained construction information, display content controller 430 makes a comparison with topography of target design topography data and confirms the construction status.

Subsequently, display controller 43 determines whether a work for the target design topography has been completed (step S13). Specifically, display content controller 430 determines based on the obtained construction information whether the current topography is substantially the same as the topography of the target design topography data.

When in step S13 display controller 43 determines that the work for the target design topography has been completed (YES in step S13), the control proceeds to the next step S16. Specifically, when display content controller 430 determines based on the obtained construction information that the current topography is substantially the same as the topography of the target design topography data, display content controller 430 determines that the work has been completed, and determines whether there is next target design topography data.

On the other hand, if it is determined in step S13 that the work for the target design topography has not been completed (NO in step S13), display controller 43 returns to step S11 and repeats the above process. Specifically, when display content controller 430 determines based on the obtained construction information that the current topography is not substantially the same as the topography of the target design topography data, display content controller 430 determines that the work has not been completed, and the control returns to step S11 and repeats the above process.

Thus, even when there is no input of a manipulation via manipulation device 10 (i.e., a selection instruction), target design topography based on next target design topography data is automatically displayed when it is determined that a work has been completed based on construction information obtained in construction information obtainer 42.

Therefore, no user operation is required to change displaying, and further increased working efficiency can be achieved. Further, as whether a work has been completed is determined based on construction information, it is not necessary to determine whether the work has been completed through the user's visual observation, and further increased working efficiency can be achieved.

e2. Second Modification

Work vehicle 101 may include a display device having a configuration different from that of display device 44. Specifically, work vehicle 101 may include a combiner as a display device.

Figure 9:
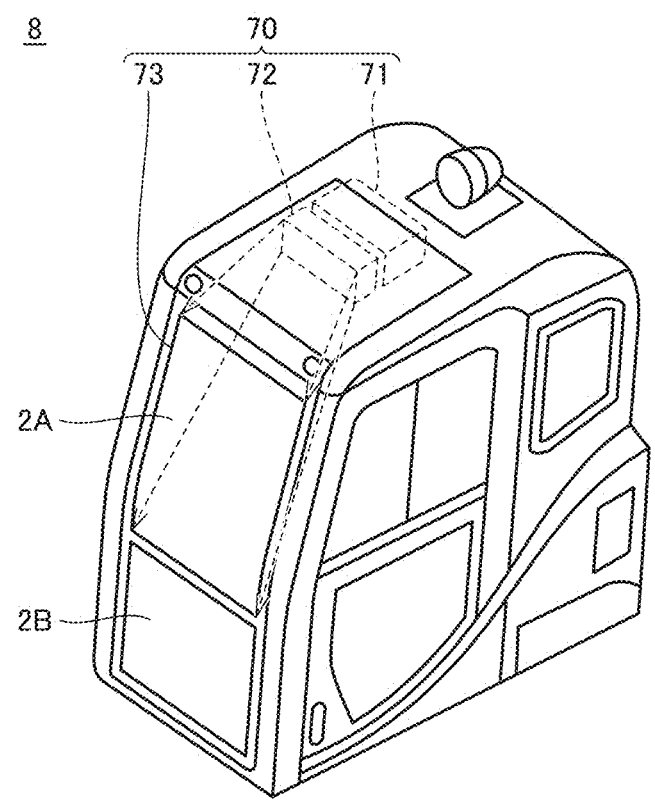
FIG. 9 is a diagram showing another display device having a configuration different from that of display device 44 according to an embodiment.

FIG. 9 is a diagram showing another display device having a configuration different from that of display device 44 according to an embodiment.

As shown in FIG. 9, a display device 70 is provided in cab 8, and has a projection device 71, an optical lens system 72, and a combiner 73.

Projection device 71 is a projector. Optical lens system 72 is disposed between projection device 71 and combiner 73. Optical lens system 72 has a plurality of lenses. Optical lens system 72 has the plurality of lenses with some thereof movable along the optical axis.

Combiner 73 is disposed at front windshield 2A. Combiner 73 may be disposed at front windshield 2A and front windshield 2B. Combiner 73 is composed of a half mirror which reflects a part of light and transmits a remainder thereof. Combiner 73 reflects an image projected by projection device 71 to the side of the operator in cab 8 and transmits light from the outside of cab 8 to the interior of cab 8.

Thus, display device 70 allows the operator to recognize the image projected on combiner 73 as a virtual image overlaid and thus displayed on an actual view in front of cab 8.

Thus a work vehicle comprising display device 70 using combiner 73 can also achieve an effect similar to that of work vehicle 101 of an embodiment.

e3. Third Modification

While in the above description a configuration in which display device 44 displays in a display area inside opening frame 9A has been described as an example, the present invention is not limited thereto. Display device 44 may also display an inside of opening frame 9B as a display area. That is, cab 8 may be configured to include a transparent dual display. In that case, display controller 43 will control displaying in two display areas. It is also possible to provide another display device for the display area of opening frame 9B.

A work vehicle having such a configuration can also achieve an effect similar to that obtained by work vehicle 101 described above. Note that in the above case, the work assistance information can also be displayed in a display area of the lower display device.

While a hydraulic excavator has been described as an example of a work vehicle, the work vehicle is also applicable to a backhoe loader and other work vehicles.

It should be understood that the embodiments disclosed herein are illustrative and not limited to the above disclosure. The scope of the present invention is defined by the terms of the claims, and is intended to include any modifications within the meaning and scope equivalent to the terms of the claims.

REFERENCE SIGNS LIST

1: travel unit; 2: front windshield; 2A: front windshield; 2B: front windshield; 3: revolving unit; 4: work implement; 5: boom; 6: dipper stick; 7: bucket; 7A: teeth; 8: cab; 9: frame; 9A, 9B: opening frame; 10: manipulation device; 11L, 11R: manipulation member; 12: manipulation detector; 13: travel manipulation member; 14: travel manipulation detector; 20: work implement controller; 21: storage; 22: processor; 30: work implement drive device; 31: proportional control valve; 40: display system; 41: positional information obtainer; 42: construction information obtainer; 43: display controller; 44, 70: display device; 45: memory; 46: manipulation input receiver; 71: projection device; 72: optical lens system; 73: combiner; 101: work vehicle; 430: display content controller; 433: image generator.

The invention claimed is:

1. A work vehicle comprising:
a work implement;
a main body to which the work implement is attached, and having a cab;
a display device provided in the cab and configured to overlay and thus display work assistance information on an actual view of a work site; and
a display controller causing the display device to display target design topography as the work assistance information,
when a work starts, the display controller causing the display device to display final target design topography that is achieved after the work is completed, and subsequently, switching to displaying target design topography to be achieved depending on a working step performed.

2. The work vehicle according to claim 1, further comprising:
a storage that stores the final target design topography divided into a plurality of segments,
wherein the display controller switches target design topography displayed on the display device corresponding to a first segment to displaying target design topography corresponding to a second segment.

3. The work vehicle according to claim 2, wherein, in response to an indication of a manipulation done by an operator in the cab, the display controller switches the target design topography displayed on the display device corresponding to the first segment to displaying the target design topography corresponding to the second segment.

4. The work vehicle according to claim 2, wherein, based on a comparison of an obtained information of current topography with the target design topography, the display controller switches the target design topography displayed on the display device corresponding to the first segment to displaying the target design topography corresponding to the second segment.

5. A method for controlling a work vehicle that includes a work implement; a main body to which the work implement is attached, and having a cab; and a display device provided in the cab and configured to overlay and display work assistance information on an actual view of a worksite, the method comprising the steps of:
when a work starts, displaying on the display device as work assistance information final target design topography that is achieved after the work is completed; and
after the final target design topography is displayed, switching to displaying target design topography to be achieved depending on a working stepper formed.

* * * * *